United States Patent
Herwig

(10) Patent No.: US 9,135,789 B2
(45) Date of Patent: *Sep. 15, 2015

(54) METHOD AND APPARATUS FOR REDUCING RECOGNITION TIMES IN AN IMAGE-BASED PRODUCT RECOGNITION SYSTEM

(75) Inventor: Nathaniel Christopher Herwig, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 477 days.

This patent is subject to a terminal disclaimer.

(21) Appl. No.: 13/562,838

(22) Filed: Jul. 31, 2012

(65) Prior Publication Data

US 2014/0036630 A1    Feb. 6, 2014

(51) Int. Cl.
*G01S 15/89*    (2006.01)
*G07G 1/00*    (2006.01)
*G01S 15/02*    (2006.01)
*G01S 7/539*    (2006.01)
*G06K 9/62*    (2006.01)
*G01G 19/414*    (2006.01)

(52) U.S. Cl.
CPC .............. *G07G 1/0054* (2013.01); *G01S 7/539* (2013.01); *G01S 15/025* (2013.01); *G06K 9/6289* (2013.01); *G07G 1/0063* (2013.01); *G01G 19/4144* (2013.01)

(58) Field of Classification Search
CPC .... G07G 1/0054; G07G 1/0063; G01S 7/539; G01S 15/025; G06K 9/6289; G01G 19/4144; G01N 29/04; G01N 33/02

USPC .................................................. 367/95, 87
See application file for complete search history.

(56) References Cited

U.S. PATENT DOCUMENTS

| | | | | |
|---|---|---|---|---|
| 5,083,638 A | * | 1/1992 | Schneider | 235/383 |
| 5,589,209 A | * | 12/1996 | Mizrach et al. | 426/231 |
| 6,332,573 B1 | * | 12/2001 | Gu et al. | 235/462.06 |
| 6,505,775 B1 | * | 1/2003 | Gu et al. | 235/454 |
| 7,191,698 B2 | * | 3/2007 | Bond et al. | 99/330 |
| 8,113,427 B2 | * | 2/2012 | Ross et al. | 235/454 |
| 8,317,101 B2 | * | 11/2012 | Herwig | 235/439 |
| 8,825,531 B1 | * | 9/2014 | Catoe | 705/16 |
| 2002/0123932 A1 | * | 9/2002 | Brenhouse | 705/16 |
| 2009/0140046 A1 | * | 6/2009 | Landers et al. | 235/385 |
| 2010/0206951 A1 | * | 8/2010 | Herwig | 235/439 |
| 2014/0036630 A1 | * | 2/2014 | Herwig | 367/87 |

* cited by examiner

*Primary Examiner* — Daniel Pihulic

(74) *Attorney, Agent, or Firm* — Michael Chan; Paul W. Martin

(57) ABSTRACT

A product recognition system comprises a product image data collector arranged to capture image data which is representative of an image of a product item. The product recognition system also comprises an acoustic energy source arranged to emit acoustic energy towards the product item. The product recognition further comprises a product acoustic data collector arranged to (i) capture acoustic energy deflected from the product item, (ii) process the captured acoustic data which has been deflected from the product item to provide product acoustic data which is representative of one or more characteristics of the product item, and (iii) compare the product acoustic data with a store of reference acoustic data to provide one or more subsets of items against which the captured image data can be compared to identify the product item.

18 Claims, 4 Drawing Sheets

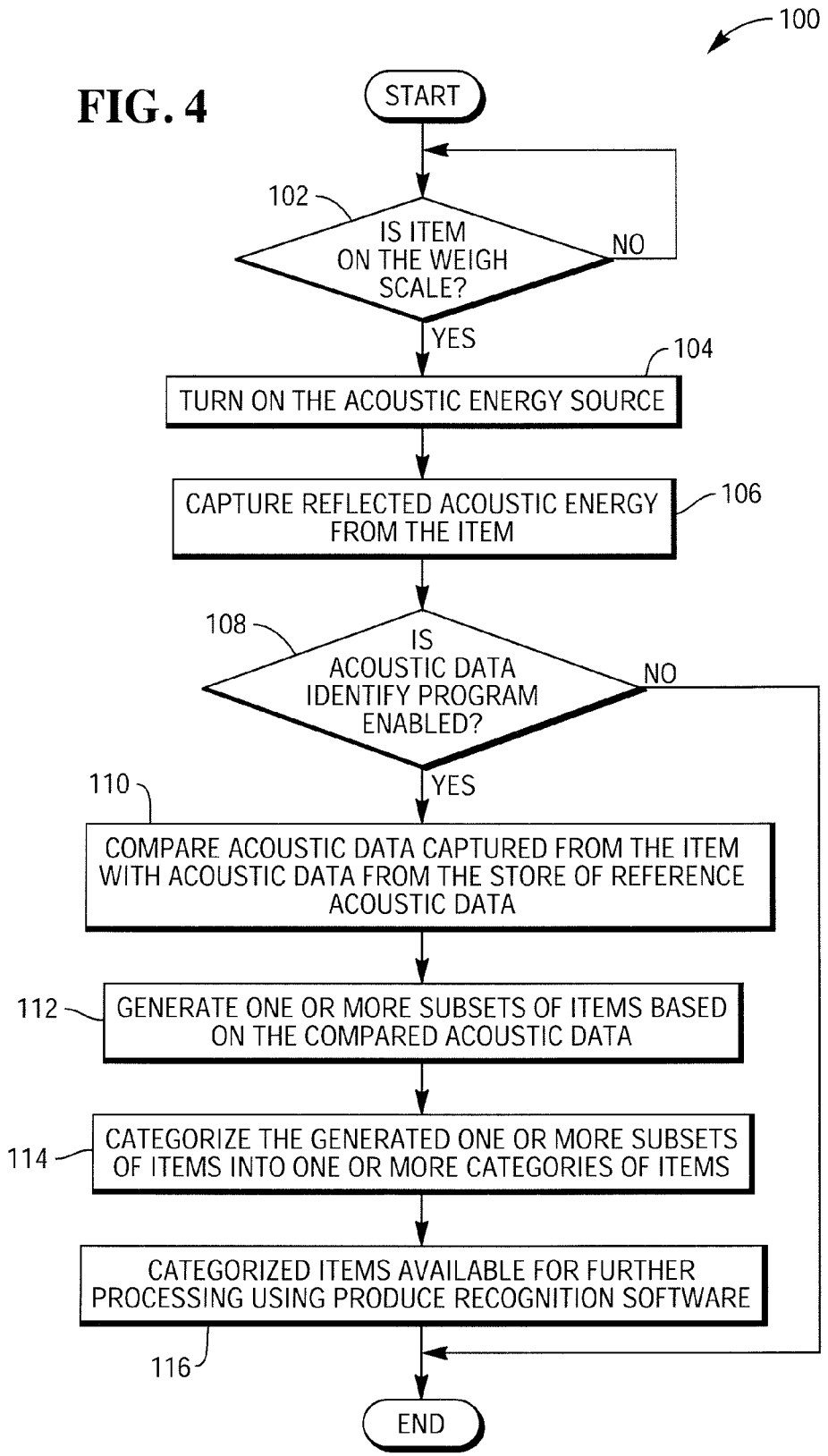

METHOD AND APPARATUS FOR REDUCING RECOGNITION TIMES IN AN IMAGE-BASED PRODUCT RECOGNITION SYSTEM

BACKGROUND

The present application relates to product recognition systems, and is particularly directed to a method and apparatus for reducing recognition times in an image-based product recognition system. The method and apparatus may be embodied in an image-based product recognition system in a retail checkout environment, wherein the "product" may be either a general merchandise item, or more specifically a "produce" item (examples being fruits, vegetables, and items sold in "bulk").

Automated or operator-assisted identification methods for identifying produce items are known. Some produce identification methods are based on image recognition. A typical image-based produce identification method based on image recognition may include an imaging camera which is used to capture produce image data associated with a produce item placed on a produce weighing scale. The captured produce image data is then processed to either identify the produce item or to display a list and/or stored images of produce items on the list for selection by a customer or an operator.

A drawback in using captured produce image data to identify a produce item is that the recognition time can be long. This would occur especially when there is a relatively large database of items against which the captured produce image data needs to be compared to identify the produce item. It would be desirable to reduce long recognition times associated with produce identification methods which are based on image recognition.

SUMMARY

In accordance with one embodiment, a product recognition system comprises a product image data collector arranged to capture image data which is representative of an image of a product item. The product recognition system also comprises an acoustic energy source arranged to emit acoustic energy towards the product item. The product recognition further comprises a product acoustic data collector arranged to (i) capture acoustic energy deflected from the product item, (ii) process the captured acoustic data which has been deflected from the product item to provide product acoustic data which is representative of one or more characteristics of the product item, and (iii) compare the product acoustic data with a store of reference acoustic data to provide one or more subsets of items against which the captured image data can be compared to identify the product item. In this manner, the list of potential "matches" can be reduced to just a few items or, in some cases, to a single item. By reducing the number of possible candidates, any subsequent image recognition time is also reduced.

BRIEF DESCRIPTION OF THE DRAWINGS

FIG. 4 is a flow diagram which depicts operation of a method in accordance with one embodiment to process produce acoustic data in the produce acoustic data collector of FIGS. 1, 2, and 3.

DETAILED DESCRIPTION

Figure 1:
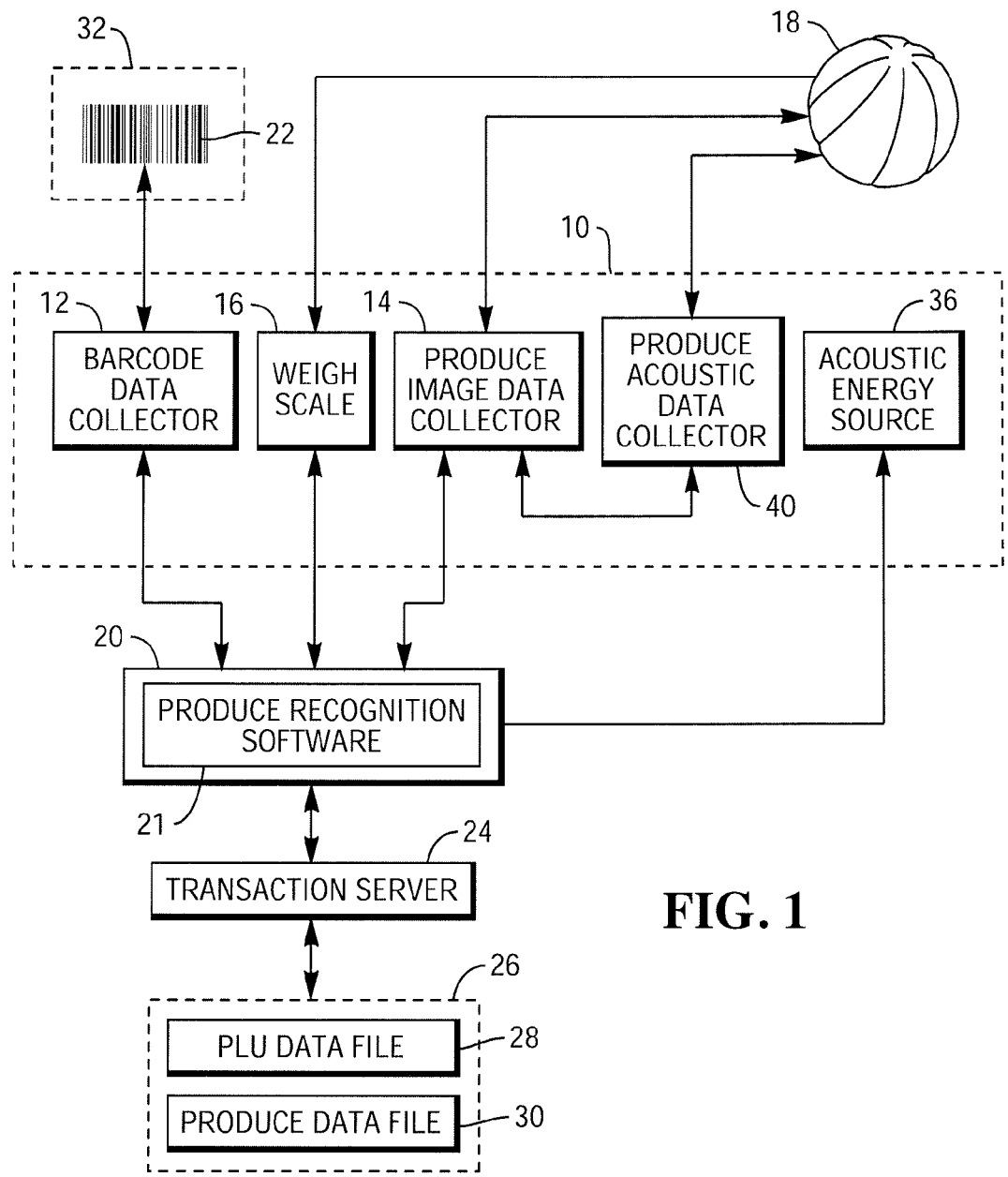
FIG. 1 is a block diagram of a transaction processing system including an item checkout device containing a produce acoustic data collector constructed in accordance with one embodiment.

Referring to FIG. 1, item checkout device 10 includes barcode data collector 12, weigh scale 16, produce image data collector 14, acoustic energy source 36, and produce acoustic data collector 40.

Barcode data collector 12 reads barcode 22 on merchandise item 32 to obtain an item identification number, also known as a price look-up (PLU) number, associated with item 32. Barcode data collector 12 may be any barcode data collector, including an optical barcode scanner which uses laser beams to read barcodes. Barcode data collector 12 may be located within a checkout counter, mounted on top of a checkout counter, or be a wired or wireless portable or hand-held barcode scanner.

Scale 16 determines a weight for produce item 18. Scale 16 works in connection with barcode data collector 12, produce image data collector 14, and produce acoustic data collector 40, but may be designed to operate and be mounted separately. Weight information from scale 16 may be used to help identify produce item 18.

Produce image data collector 14 collects image data (which may comprise monochrome, color, infrared, or other image data) associated with produce item 18 for the purpose of identifying produce item 18. Produce image data collector 14 may include an image capture device (not shown) in the form of a charge coupled device (CCD). As another example, image capture device may be in the form of a complementary metal oxide semiconductor (CMOS) camera. Other types of image capture devices are also possible. Reference produce image data is collected and stored within produce data file 30. During a transaction, produce image data is collected and compared to produce image data within produce data file 30. Produce image data collector 14 may act as a primary means of identifying produce item 18. Produce image data collector 14 may be combined with barcode data collector 12 into an integrated unit.

Acoustic energy source 36 transmits acoustic energy towards produce item 18. Acoustic energy source 36 may comprise an ultrasonic or subsonic emitter, for example. Acoustic energy directed towards produce item 18 is deflected or reflected. Produce acoustic data collector 40 captures acoustic energy deflected or reflected from produce item 18. Produce acoustic data collector 40 processes the deflected or reflected acoustic energy to provide information which can be used to assist produce image data collector 14 in identifying produce item 18. Produce acoustic data collector 40 may be combined with produce image data collector 14, barcode data collector 12, and/or weigh scale 16 into an integrated unit.

Figure 2:
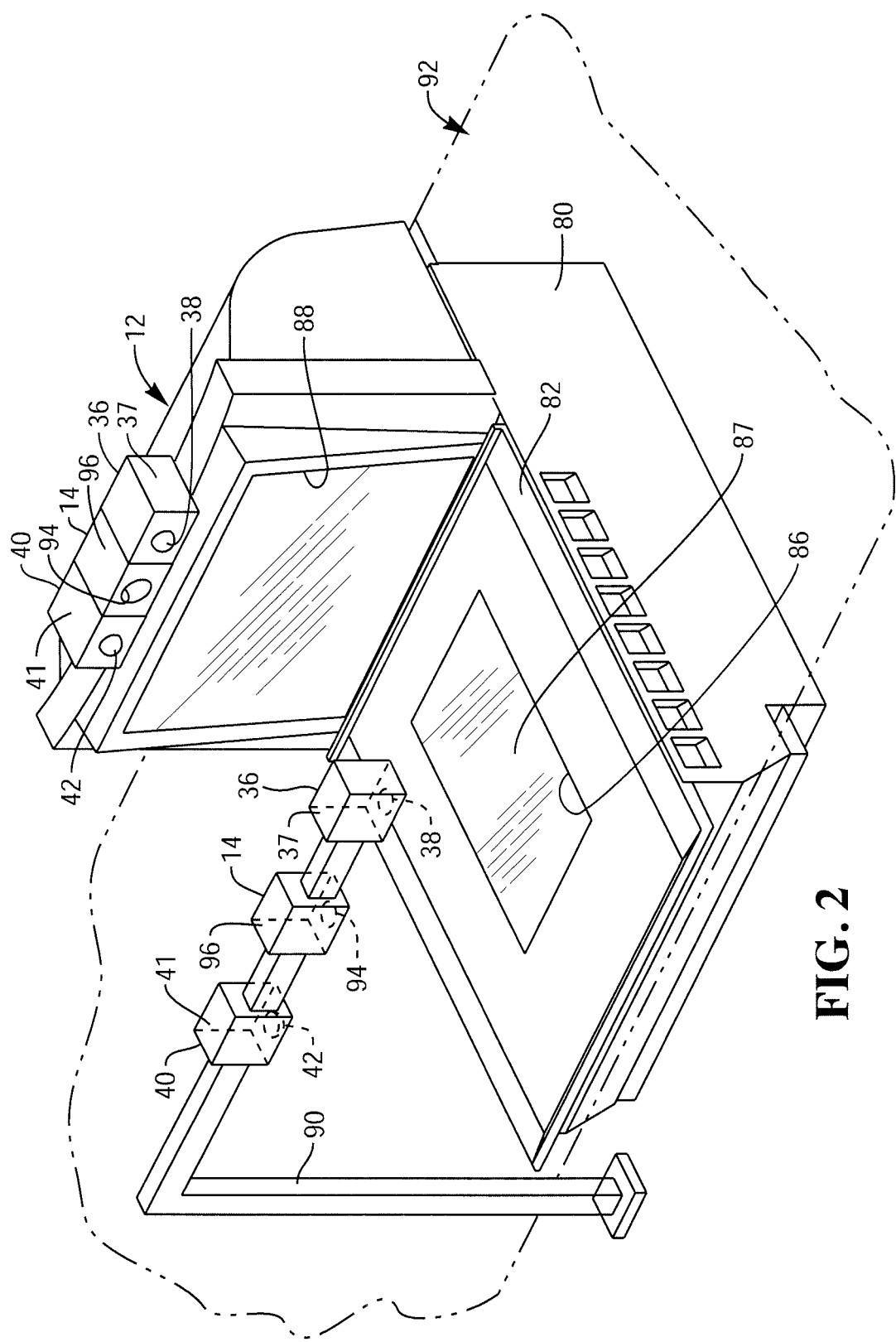
FIG. 2 is a perspective view of the item checkout device of FIG. 1, and showing the produce acoustic data collector.

Referring to FIG. 2, example mounting arrangements are shown for one or more produce image data collector 14, acoustic energy source 36, and produce acoustic data collector 40. A first mounting arrangement is to mount housing 96 of produce image data collector 14, housing 37 of acoustic energy source 36, and housing 41 of produce acoustic data collector 40 within housing 80 of optical barcode scanner 12 (FIG. 1).

Produce image data collector 14 is mounted outside the paths of light within optical barcode scanner 12 to avoid interference with the operation of optical barcode scanner 12. In this first mounting arrangement, produce image data collector 14 is mounted above aperture 88 of optical barcode scanner 12 so that aperture 94 of produce image data collector 14 faces diagonally downward toward aperture 86 of optical barcode scanner 12. A glass piece 87 is disposed in aperture 86 and provides, in addition to its primary purpose for allowing barcode scanner 12 to identify objects, a surface on which produce item 18 can be placed.

Produce acoustic data collector 40 is mounted adjacent to one side of produce image data collector 14, and acoustic energy source 36 is mounted adjacent to an opposite side of produce image data collector 14. Acoustic energy source 36 and produce acoustic data collector 40 are disposed on the same side of produce item 18 to be identified. In this first mounting arrangement, produce acoustic data collector 40 is mounted relative to acoustic energy source 36 so that acoustic energy from emitter 38 of acoustic energy source 36 is directed towards a produce item which is placed on the top surface of weighing plate 82 of weigh scale 16 (FIG. 1), and so that acoustic sensor 42 of produce acoustic data collector 40 detects acoustic energy deflected or reflected from the produce item.

Although produce image data collector 14 is shown in FIG. 2 as being located between produce acoustic data collector 40 and acoustic energy source 36, it is conceivable that produce image data collector 14 be located anywhere relative to produce acoustic data collector 40 and acoustic energy source 36. Also, although produce acoustic data collector 40 and acoustic energy source 36 are shown as separate units, it is conceivable that produce acoustic data collector 40 and acoustic energy source 36 may be combined as an integrated unit. Further, although produce image data collector 14 is shown as a separate unit from produce acoustic data collector 40 and acoustic energy source 36, it is conceivable that produce image data collector 14 may be combined as an integrated unit with either produce acoustic data collector 40 or acoustic energy source 36, or both.

A second mounting arrangement is to attach housing 96 of produce image data collector 14, housing 41 of produce acoustic data collector 40, and housing 37 of acoustic energy source 36 to a pole 90 mounted to checkout counter 92. Aperture 94 of produce image data collector 14 faces downward, acoustic sensor 42 of produce acoustic data collector 40 faces downward, and emitter 38 of acoustic energy source 36 also faces downward. In this second mounting arrangement, produce acoustic data collector 40 is mounted relative to acoustic energy source 36 so that acoustic energy from emitter 38 is directed towards a produce item which is placed on the top surface of weighing plate 82 of weigh scale 16 (FIG. 1), and so that acoustic sensor 42 of produce acoustic data collector 40 detects acoustic energy deflected or reflected from the produce item. Other mounting arrangements are also possible. For example, either acoustic energy source 36 or produce acoustic data collector 40, or both, may be embedded in weighing plate 82 of weigh scale 16. In each case, an operator initiates operation of produce image data collector 14 at transaction terminal 20 and places produce item 18 in field of view of aperture 94 of produce image data collector 14.

Transaction terminal 20 communicates with item checkout device 10, which in turn controls operation of produce image data collector 14 to identify produce item 18. This series of operations thereby allows an operator to complete a transaction with a customer. Alternatively, transaction server 24 may identify produce item in a network of transaction terminals 20. In either case, transaction server 24 obtains item identification information from produce data file 30 and sends corresponding unit price from PLU data file 28 to transaction terminal 20. PLU data file 28 and produce data file 30 are stored within storage medium 26, but either may also be located instead at transaction terminal 20.

More specifically, when produce item 18 is placed on scale 16, weight information for produce item 18 is sent from scale 16 to transaction terminal 20 so that transaction terminal 20 can determine a price for produce item 18 based upon the weight information. When produce item 18 is on scale 16, produce item 18 is in the field of view of aperture 94 of produce image data collector 14. Transaction terminal 20 executes known produce recognition software 21 which obtains image data containing produce image information from produce image data collector 14, and compares the produce image data with reference produce image data in produce data file 30 to identify produce item 18.

After produce item 18 is identified, transaction terminal 20 obtains a unit price from PLU data file 28 for the identified produce item. Transaction terminal 20 then calculates a price for produce item 18 by multiplying the unit price by the weight of produce item obtained from scale 16. Transaction terminal 20 incorporates produce item 18 and its calculated price into a transaction record.

Figure 3:
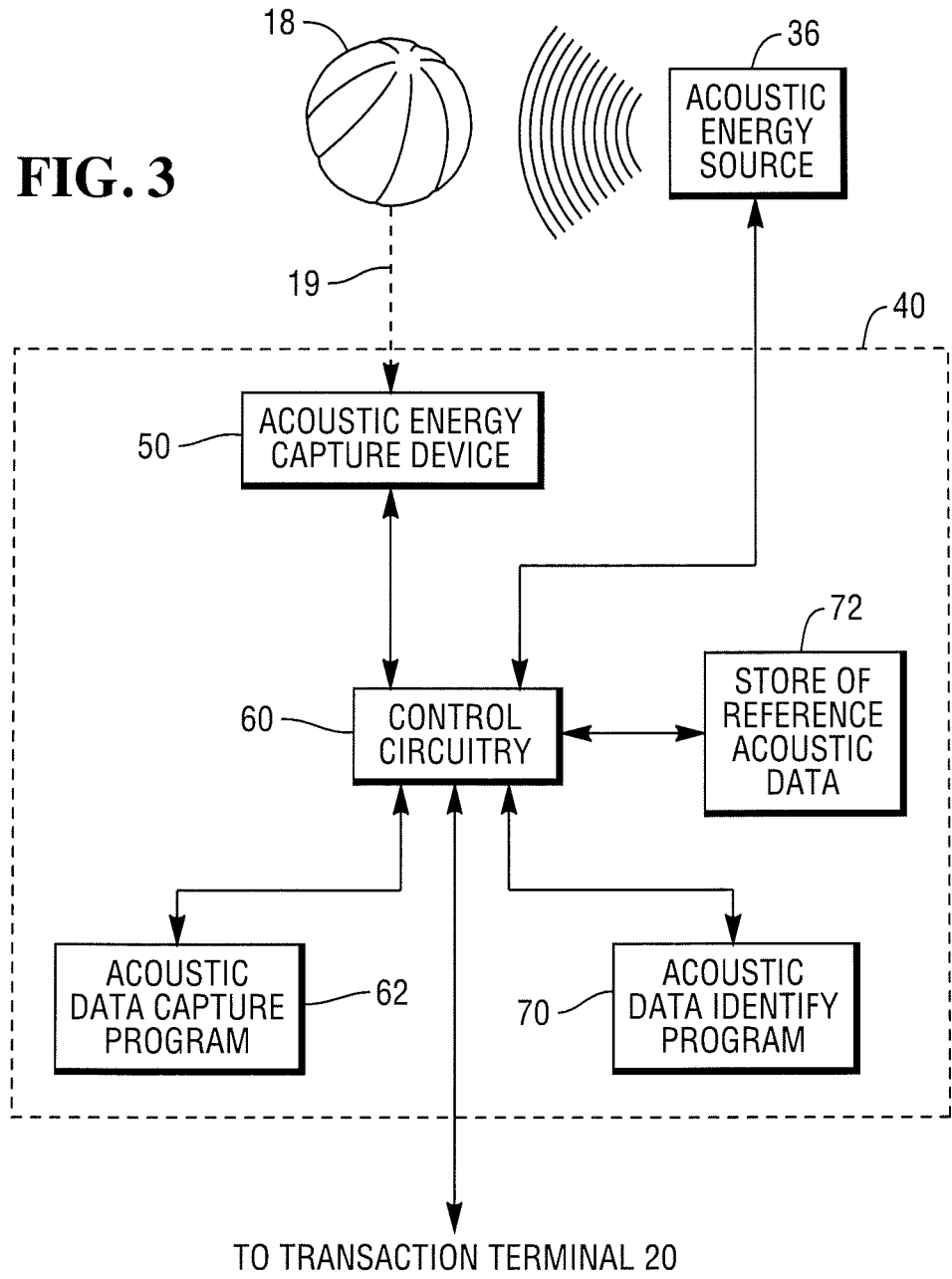
FIG. 3 is a block diagram of the produce acoustic data collector shown in FIGS. 1 and 2.

Referring to FIG. 3, components of produce acoustic data collector 40 include acoustic energy capture device 50, control circuitry 60, acoustic data capture program 62, acoustic data identify program 70, and a store 72 of reference acoustic data. As already described hereinabove, acoustic energy source 36 emits acoustic energy towards produce item 18. Acoustic energy capture device 50 captures deflected or reflected acoustic energy from produce item 18 (as shown by dashed line 19 in FIG. 3). The store 72 of reference acoustic data is representative of characteristics of a relatively large database of items against which captured acoustic data which is representative of one or more characteristics of produce item 18 is compared.

The type of acoustic energy capture device 50 depends upon the type of acoustic energy source 36 used. For example, if acoustic energy source 36 emits a beam of ultrasonic energy, then acoustic energy capture device 50 receives and captures a deflected or reflected beam of ultrasound. Theoretically, the ultrasonic beam causes produce item 18 to deflect acoustic energy, vibrate, shift the frequency of the reflected or deflected acoustic energy, or simply absorb acoustic energy. Various produce items 18 may exhibit a combination of these reactions, such as reflecting a portion of the acoustic energy while converting the remaining energy into heat or vibrations.

Other types of acoustic energy capture devices are possible. As an example, acoustic energy capture device 50 may be of the type which receives and captures a deflected or reflected beam of non-ultrasonic energy. A combination of acoustic energy types may also be used by incorporating multiple types of acoustic energy emitters and/or acoustic energy collectors. Each of the acoustic data capture program 62, the acoustic data identify program 70, and the store 72 of reference acoustic data may be stored in separate storage memories or together in a single storage memory.

Control circuitry 60 controls acoustic data capture device 50 in accordance with executable instructions of acoustic data capture program 62 to capture an acoustic profile which is representative of one or more characteristics of produce item 18. Control circuitry 60 may include any number of electronic processors or microcomputers, and memory as needed for operation of produce acoustic data collector 40. Suitable electronic processors, microcomputers, and memories are known and commercially available and, therefore, will not be described.

When produce item 18 is placed on scale 16, control circuitry 60 controls acoustic energy source 36 to emit acoustic energy towards produce item 18. Acoustic data capture device 50 captures deflected energy or reflected energy from produce item 18. Control circuitry 60 controls timing of acoustic energy source 36 as to when to emit energy and when to stop emitting energy. Control circuitry 60 also controls timing of acoustic data capture device 50 as to when to capture deflected/reflected energy from produce item 18. Control circuitry 60 controls timing of acoustic energy source 36 and timing of acoustic data capture device 50 such that acoustic energy source 36 stops emitting energy when acoustic data capture device 50 starts capturing deflected/reflected energy. This allows produce acoustic data collector 40 to differentiate between energy emitted from acoustic energy source 36 and energy deflected/reflected from produce item 18.

Alternatively, acoustic energy capture device 50 may capture an acoustic profile of produce item 18 in response to operated-initiated commands from transaction terminal 20. In either case, control circuitry 60 processes the captured acoustic data which is representative of one or more characteristics of produce item 18 in accordance with executable instructions of acoustic data identify program 70 to provide a relatively small subset of items from the relatively large database of items contained in the store 72, as will be described in more detail hereinbelow.

Referring to FIG. 4, flow diagram 100 depicts operation of a method in accordance with one embodiment to assist produce image data collector 14 in identifying the produce item 18 which has been placed on weighing plate 82 of weigh scale 16.

In step 102, a determination is made as to whether a produce item has been placed on scale 16. If determination in step 102 is negative (i.e., no produce item has been placed on scale 16), the process proceeds back to step 102 to await placement of a produce item on scale 16. However, if determination in step 102 is affirmative (i.e., a produce item has been placed on scale 16), then the process proceeds to step 104 in which acoustic energy source 36 is actuated to turn on. The process then proceeds to step 106.

In step 106, acoustic energy capture device 50 (FIG. 3) captures acoustic energy deflected or reflected from of produce item 18. Then, in step 108, a determination is made as to whether acoustic data identify program 70 is enabled. If determination in step 108 is negative (i.e., acoustic data identify program 70 is not enabled), then the process terminates. When the process terminates, the captured acoustic energy of the produce item 18 is not processed, and the captured produce image data is passed on to transaction terminal 20 and transaction server 24 to identify produce item 18 and to calculate a price for the identified produce item as previously described hereinabove. However, if determination in step 108 is affirmative (i.e., the acoustic data identify program 70 is enabled), then the process proceeds to step 110.

In step 110, acoustic data which is representative of the captured acoustic energy from produce item 18 is compared with acoustic data from the store 72 of reference acoustic data (FIG. 3) which is representative of characteristics of a relatively large database of items. Then, in step 112, one or more subsets of possible items from the relatively large database of items are generated based upon the acoustic data comparisons in step 110. The comparisons of acoustic data in step 110 and the generation of the one or more subsets of possible items in step 112 result in generation of different categories of possible items. Item categories may include, but are not limited to, rigid items, semi-rigid items, and soft items. Cans, jars, and the like are examples of rigid items. Cardboard containers and the like are examples of semi-rigid items. Toilet tissue, paper napkins, and the like are examples of soft items.

As shown in step 116, the categorized items are provided to produce image data collector 14 to assist produce image data collector 14 in identifying produce item 18. More specifically, control circuitry 60 sends the one or more categories of possible items to produce image data collector 14. Transaction terminal 20 then controls produce image data collector 14 using known produce recognition software 21 (FIG. 1) as previously described hereinabove.

Although the above description describes a method and apparatus for assisting an image-based recognition system to identify produce items, the method and apparatus are equally useful for assisting an image-based recognition system to identify non-produce items.

Also, although the above description describes acoustic energy source 36 and produce acoustic data collector 40 being part of item checkout device 10 (FIG. 1), it is conceivable that acoustic energy source 36 and produce acoustic data collector 40 be part of a separate platform or scale on which produce such as fruits and vegetables can be placed. It is also conceivable that acoustic energy source 36 and produce acoustic data collector 40 be integrated into or around a conveyor belt.

Further, although the above description describes produce acoustic data being used in conjunction with produce image data to identify a produce item, it is conceivable that produce acoustic data may be used in conjunction with a combination of other types of produce characteristics data such as produce shape data, produce area density data, and produce texture data to aid in identification of the produce item.

It should be apparent that the above description describes a method to assist produce recognition software 21 in identifying produce item 18 by providing produce recognition software 21 with a relatively small subset of items from a relatively large database of items against which produce item 18 can be compared and identified based upon the comparisons. Produce item 18 is effectively categorized into a broad product class or package type. Recognition times of produce recognition software layer 21 are reduced by categorizing produce item 18 into a broad product class or package type.

It should further be apparent that the above description describes a controlled method to assist produce recognition software 21 in identifying produce item 18 which has been placed on weighing plate 82 of scale 16. The controlled assist method is automatic in that the method is performed without human intervention.

It should also be apparent that "rigidity" or "softness" of an item is determined based upon amount or frequency, or both, of the deflected energy or reflected energy from the item. If acoustic energy source 36 and produce acoustic data collector 40 comprise a combination of acoustic types (e.g., ultrasonic, "sonic", and subsonic), then the acoustic profile of an item may include a combination of frequency types. Rigid, semi-rigid, and soft items will each have a more unique "signature" if multiple frequencies are examined. Reaction to acoustic energy emitted from acoustic energy source 36 is different for different types of merchandise and packaging (for example, glass, plastic, cardboard, or paper). As an example, paper products usually have a relatively high dissipative effect and high energy absorption. As another example, a semi-rigid item may absorb certain frequencies but reflect other frequencies.

It should also be apparent that a product filtering method is provided in that 100,000 unique product items, for example, could be reduced to perhaps a few dozen or a few hundred product items. Since a typical large store can stock up to 100,000 unique items, but paper products may comprise only about 2000 product items, for example, product recognition software could theoretically perform fifty times faster. As another example, tens of thousands of canned goods, jars, and boxed items may be excluded when the product to be identified is determined to be a "soft" item. In a typical retail store, there may be only perhaps a few hundred "soft" items. Accordingly, product recognition times are improved when the database search is limited to the relatively small one or more subsets of product items obtained from the relatively large database of product items.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A product recognition system comprising:
   a product image data collector arranged to capture image data which is representative of an image of a product item;
   an acoustic energy source arranged to emit acoustic energy towards the product item; and
   a product acoustic data collector arranged to (i) capture acoustic energy deflected from the product item, (ii) process the captured acoustic data which has been deflected from the product item to provide product acoustic data which is representative of one or more characteristics of the product item, and (iii) compare the product acoustic data with a store of reference acoustic data to provide one or more subsets of items against which the captured image data can be compared to identify the product item.

2. A product recognition system according to claim 1, wherein the acoustic energy source comprises an ultrasound emitter.

3. A product recognition system according to claim 1, wherein the acoustic energy source and the product acoustic data collector are disposed on same side of the product item.

4. A product recognition system according to claim 1, further comprising a weigh scale having a weighing plate in which the acoustic energy source or the product acoustic data collector, or both, are disposed.

5. A product recognition system according to claim 1, wherein the product acoustic data collector includes (i) an acoustic energy capture device arranged to capture acoustic energy reflected from the product item, and (ii) control circuitry arranged to process the captured acoustic energy to provide acoustic data which is representative of one or more characteristics of the product item.

6. A product recognition system according to claim 5, wherein the control circuitry is further arranged to compare the product acoustic data with the store of reference acoustic data.

7. A product recognition system according to claim 6, wherein the control circuitry is further arranged to generate the one or more subsets of items against which the captured image data can be paired to identify the product item.

8. A product recognition system according to claim 7, wherein the control circuitry is further arranged to categorize the generated one or more subsets of items into one or more categories of items.

9. An apparatus for reducing recognition times in an image-based product recognition system, the apparatus comprising:
   at least one acoustic energy source arranged to emit acoustic energy towards the product item;
   a store of reference acoustic data which is representative of a relatively large database of product items;
   an acoustic energy capture device arranged to capture acoustic data which is representative of deflected acoustic energy from the product item; and
   control circuitry arranged to (i) compare the captured acoustic data with the store of reference acoustic data, (ii) identify a relatively small subset of items from the relatively large database of items based upon the comparison of the captured acoustic data with the store of reference product acoustic data, and (iii) provide the relatively small subset of product items to the image-based product recognition system to allow the product recognition system to identify the product item based upon the relatively small subset of the relatively large database of items and thereby to assist the image-based product recognition system in identifying the product item.

10. An apparatus according to claim 9, wherein the at least one acoustic energy source comprises an ultrasound emitter.

11. An apparatus according to claim 10, wherein the acoustic energy capture device comprises an ultrasound receiver.

12. An apparatus according to claim 9, wherein the store of reference product acoustic data is representative of characteristics of a relatively large database of items against which the captured acoustic data which is representative of deflected acoustic energy from the product item is compared.

13. A method of reducing recognition times in an image recognition system to identify a product item, the method comprising:
   emitting acoustic energy towards the product item to be identified;
   capturing acoustic energy deflected from the product item;
   processing the captured acoustic energy to provide acoustic data which is representative of one or more characteristics of the product item;
   comparing the acoustic data which is representative of one or more characteristics of the product item with a store of reference acoustic data which is representative of characteristics of a relatively large database of product items to provide a relatively small one or more subsets of the relatively large database of product items; and
   providing the relatively small one or more subsets of items to the image recognition system to allow the image recognition system to process the one or more subsets of items to identify the product item.

14. A method according to claim 13, wherein emitting acoustic energy towards the product item to be identified includes emitting ultrasound energy towards the product item to be identified.

15. A method according to claim 14, wherein capturing acoustic energy deflected from the product item includes capturing amount and frequency of ultrasound energy reflected from the product item.

16. A method according to claim 14, wherein capturing acoustic energy deflected from the product item includes capturing multiple frequencies of ultrasound energy reflected from the product item.

17. A method according to claim 13, wherein capturing acoustic energy deflected from the product item includes capturing amount and frequency of acoustic energy reflected from the product item.

18. A method according to claim 13, wherein capturing acoustic energy deflected from the product item includes capturing multiple frequencies of acoustic energy reflected from the product item.

* * * * *